(12) United States Patent
Lin et al.

(10) Patent No.: US 11,707,843 B2
(45) Date of Patent: *Jul. 25, 2023

(54) INITIAL REFERENCE GENERATION FOR ROBOT OPTIMIZATION MOTION PLANNING

(71) Applicant: FANUC CORPORATION, Yamanashi (JP)

(72) Inventors: Hsien-Chung Lin, Fremont, CA (US); Tetsuaki Kato, Fremont, CA (US)

(73) Assignee: FANUC CORPORATION, Yamanashi (JP)

( * ) Notice: Subject to any disclaimer, the term of this patent is extended or adjusted under 35 U.S.C. 154(b) by 208 days.

This patent is subject to a terminal disclaimer.

(21) Appl. No.: 16/839,720

(22) Filed: Apr. 3, 2020

(65) Prior Publication Data
US 2021/0308865 A1    Oct. 7, 2021

(51) Int. Cl.
B25J 9/16    (2006.01)

(52) U.S. Cl.
CPC ............. B25J 9/1666 (2013.01); B25J 9/163 (2013.01); B25J 9/1651 (2013.01); B25J 9/1676 (2013.01); B25J 9/161 (2013.01)

(58) Field of Classification Search
CPC . B25J 9/1666; B25J 9/161; B25J 9/163; B25J 9/1651; B25J 9/1676; B25J 13/08; B25J 19/04; B25J 9/0093; G05B 19/18
See application file for complete search history.

(56) References Cited

U.S. PATENT DOCUMENTS

| | | | | |
|---|---|---|---|---|
| 4,403,281 A | * | 9/1983 | Holmes | B25J 9/161 |
| | | | | 318/568.18 |
| 6,216,058 B1 | * | 4/2001 | Hosek | B25J 9/1664 |
| | | | | 700/245 |

(Continued)

FOREIGN PATENT DOCUMENTS

WO    WO-2008154932 A1 * 12/2008    ............ B25J 9/1664

OTHER PUBLICATIONS

Englert, P., Toussaint, M., "Reactive Phase and Task Space Adaptation for Robust Motion Execution", Sep. 18, 2014, IEEE/RSJ International Conference on Intelligent Robots and Systems, pp. 109-116 (Year: 2014).*

(Continued)

*Primary Examiner* — Abby Y Lin
*Assistant Examiner* — Karston G. Evans
(74) *Attorney, Agent, or Firm* — John A. Miller; Shumaker, Loop & Kendrick, LLP

(57) ABSTRACT

A robot optimization motion planning technique using a refined initial reference path. When a new path is to be computed using motion optimization, a candidate reference path is selected from storage which was previously computed and which has similar start and goal points and collision avoidance environment constraints to the new path. The candidate reference path is adjusted at all state points along its length to account for the difference between the start and goal points of the new path compared to those of the previously-computed path, to create the initial reference path. The initial reference path, adjusted to fit the start and goal points, is then used as a starting state for the motion optimization computation. By using an initial reference path which is similar to the final converged new path, the optimization computation converges more quickly than if a naïve initial reference path is used.

20 Claims, 5 Drawing Sheets

(56) References Cited

U.S. PATENT DOCUMENTS

| | | | |
|---|---|---|---|
| 8,352,074 | B2 | 1/2013 | Guochunxu et al. |
| 8,831,777 | B2 | 9/2014 | Kimoto |
| 8,924,016 | B2 | 12/2014 | Kim et al. |
| 9,411,335 | B2 | 8/2016 | Kim et al. |
| 9,701,019 | B2 | 7/2017 | Eberst et al. |
| 9,764,469 | B1 | 9/2017 | Sun et al. |
| 9,981,383 | B1* | 5/2018 | Nagarajan ............... B25J 9/1666 |
| 9,993,923 | B2 | 6/2018 | Terada |
| 10,105,849 | B1* | 10/2018 | Wernersbach ......... B25J 9/1687 |
| 10,189,161 | B2 | 1/2019 | Yoshino |
| 10,279,476 | B2 | 5/2019 | Jaekel et al. |
| 10,946,519 | B1* | 3/2021 | Prats ....................... G05B 15/00 |
| 2006/0149421 | A1* | 7/2006 | Akiyama ............... B25J 9/1664 700/245 |
| 2007/0005179 | A1* | 1/2007 | Mccrackin ........... G06Q 10/047 700/213 |
| 2010/0114338 | A1 | 5/2010 | Bandyopadhyay et al. |
| 2015/0266182 | A1 | 9/2015 | Strandberg |
| 2016/0000511 | A1* | 1/2016 | Hoffmann ............... B25J 9/1628 606/130 |
| 2017/0364076 | A1* | 12/2017 | Keshmiri ................. G05D 1/02 |
| 2018/0236657 | A1* | 8/2018 | Kuwahara .............. B25J 9/1605 |
| 2018/0297204 | A1 | 10/2018 | Krasny et al. |
| 2019/0184561 | A1* | 6/2019 | Yip ......................... G06N 5/046 |
| 2019/0202056 | A1 | 7/2019 | Xiong et al. |
| 2019/0232496 | A1 | 8/2019 | Graichen et al. |
| 2020/0023518 | A1* | 1/2020 | Wang ..................... B25J 9/1653 |
| 2020/0278686 | A1* | 9/2020 | Liu ....................... G05B 13/048 |
| 2021/0026329 | A1* | 1/2021 | Szabo ................... H04L 67/146 |
| 2021/0053220 | A1* | 2/2021 | Ames ..................... B25J 9/1651 |
| 2021/0197378 | A1* | 7/2021 | Schonherr .............. B25J 9/1666 |
| 2022/0063099 | A1* | 3/2022 | Lin .......................... B25J 19/02 |

OTHER PUBLICATIONS

Berenson D., Abbeel P., Goldberg K., "A Robot Path Planning Framework that Learns from Experience," May 2012, IEEE, International Conference on Robotics and Automation, pp. 3671-3678 (Year: 2012).*

The Convex Feasible Set Algorithm for Real Time Optimization in Motion Planning; Changliu Liu, Chung-Yen Lin, and Masayoshi Tomizuka; 23 pages; https://arxiv.org/pdf/1709.00627.pdf; Department of Mechanical Engineering, University of California at Berkeley, Berkeley, CA 94720, USA; SIAM Journal on Control and Optimization.

Fast Robot Motion Planning with Collision Avoidance and Temporal Optimization; Hsien-Chung Lin, Changliu Liu, and Masayoshi Tomizuka; https://par.nsf.gov/servlets/purl/10101082; 2018; 7 pages; 2018 15th International Conference on Control, Automation, Robotics and Vision (ICARCV) IEEE.

Chomp: Covariant Hamiltonian Optimization for Motion Planning; Matt Zucker, Nathan Ratliff, Anca D. Dragan, Mihail Pivtoraiko, Matthew Klingensmith, Christopher M. Dellin, J. Andrew Bagnell, Siddhartha S. Srinivasa; The International Journal of Robotics Research 32.9-10 (2013) 45 pages.

Finding Locally Optimal, Collision-Free Trajectories with Sequential Convex Optimization; John Schulman, Jonathan Ho, Alex Lee, Ibrahim Awwal, Henry Bradlow, and Pieter Abbffi; Robotics: Science and Systems; vol. 9. No. 1; 2013; 10 pages.

* cited by examiner

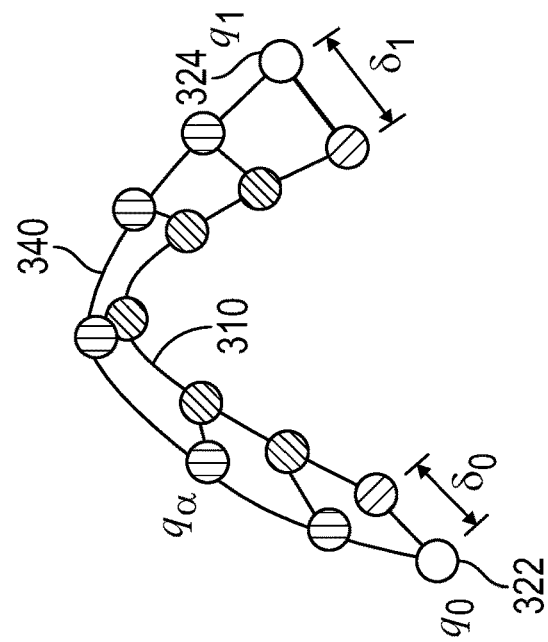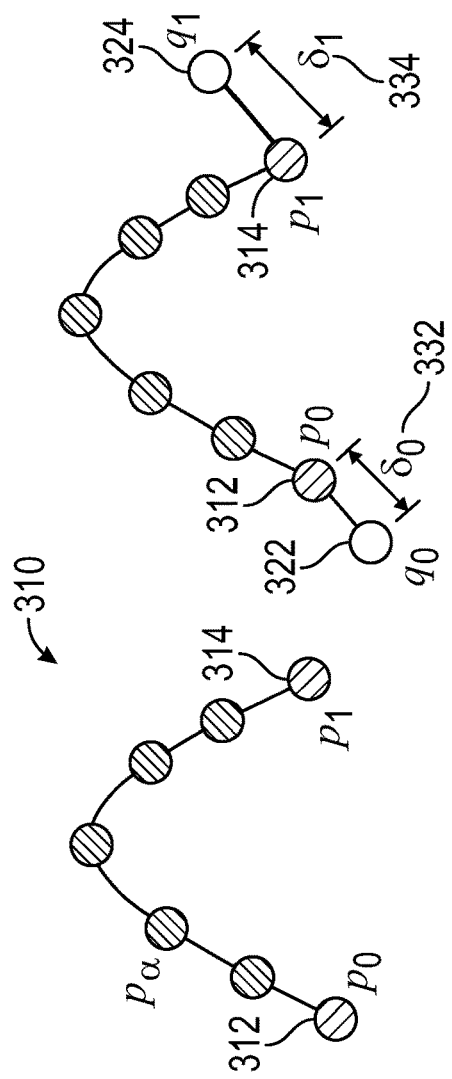
FIG. 3A
FIG. 3B
FIG. 3C

INITIAL REFERENCE GENERATION FOR ROBOT OPTIMIZATION MOTION PLANNING

BACKGROUND

Field

The present disclosure relates to the field of industrial robot motion control and, more particularly, to a robot optimization motion planning technique which creates an initial reference path for the iterative optimization computation of a new path by selecting a previously computed path which has similar start and goal points and collision avoidance constraints as the new path, and modifying the point locations along the previously computed path based on differences between the start and goal points of the new path relative to the previously computed path.

Discussion of the Related Art

The use of industrial robots to perform a wide range of manufacturing, assembly and material movement operations is well known. In some robotic applications, the start and/or goal point location changes for every robot task. This is the case, for example, when the robot's task is picking up a part from an inbound conveyor and placing the part in an open location in a shipping container. In these applications, a new robot motion path must be computed for each task in real time. Furthermore, in many robot workspace environments, obstacles are present and may be located in the path of the robot's motion. The obstacles may be permanent structures such as machines and fixtures, or the obstacles may be temporary or mobile. Collisions between the robot and any obstacle must absolutely be avoided.

One technique for robot motion planning involves modeling an optimization problem based on the start/goal points, collision avoidance constraints and other constraints, defining an initial reference path as a first iteration for the optimization computation, and running the optimization computation until it converges to a predefined criteria. The most common prior art technique for defining the initial reference path is simply defining a straight line path from the start point to the goal point of the new path. However, because of collision avoidance constraints and possibly other constraints related to robot motion limits, the final converged solution for the new path is often much different than the initial straight line path.

A problem with prior art techniques for modeling robot optimization motion planning is that it takes many iterations to compute the final converged solution for the new path because of the significant difference from the initial straight line path. If many iterations are required to reach a converged solution, the motion planning computation takes too long to be practical in an environment where the calculations must be performed in real time as the robot operates.

In light of the circumstances described above, there is a need for a robot motion planning optimization technique which uses a refined initial reference path in order to quickly converge on a solution.

SUMMARY

In accordance with the teachings of the present disclosure, a robot optimization motion planning technique using a refined initial reference path is disclosed. When a new path is to be computed using motion optimization, a candidate reference path is selected from storage which was previously computed and which has similar start and goal points and collision avoidance environment constraints to the new path. The candidate reference path is adjusted at all state points along its length to account for the difference between the start and goal points of the new path compared to those of the previously-computed path, to create the initial reference path. The initial reference path, adjusted to fit the start and goal points, is then used as a starting state for the motion optimization computation. By using an initial reference path which is similar to the final converged new path, the optimization computation converges more quickly than if a naïve initial reference path is used.

Additional features of the presently disclosed devices and methods will become apparent from the following description and appended claims, taken in conjunction with the accompanying drawings.

BRIEF DESCRIPTION OF THE DRAWINGS

FIGS. 3A, 3B and 3C are illustrations of a technique for modifying a previously computed path based on start and goal points of a new path to provide a refined initial reference path, according to an embodiment of the present disclosure;

DETAILED DESCRIPTION OF THE EMBODIMENTS

The following discussion of the embodiments of the disclosure directed to a robot optimization motion planning technique using a refined initial reference is merely exemplary in nature, and is in no way intended to limit the disclosed devices and techniques or their applications or uses.

It is well known to use industrial robots for a variety of manufacturing, assembly and material movement operations. In some types of these operations, the robot must be programmed to move along a path having a start point and a destination (goal) point which are different from one operation to the next. For example, in a move, pick and place operation, inbound parts on a conveyor may be picked up by the robot at a different location each time, and parts placed by the robot in a shipping container will each be placed in a different assigned position within the container. Many other example applications exist where a new path must be computed for each individual task or operation of the robot.

Furthermore, in many robot workspace environments, obstacles are present and may be in the path of the robot's motion—that is, one or more obstacles may be located between the start and goal points, or stated more generally, between a robot's current position and the robot's destination position. The obstacles may be permanent structures such as machines and fixtures, or the obstacles may be temporary or mobile.

Figure 1:
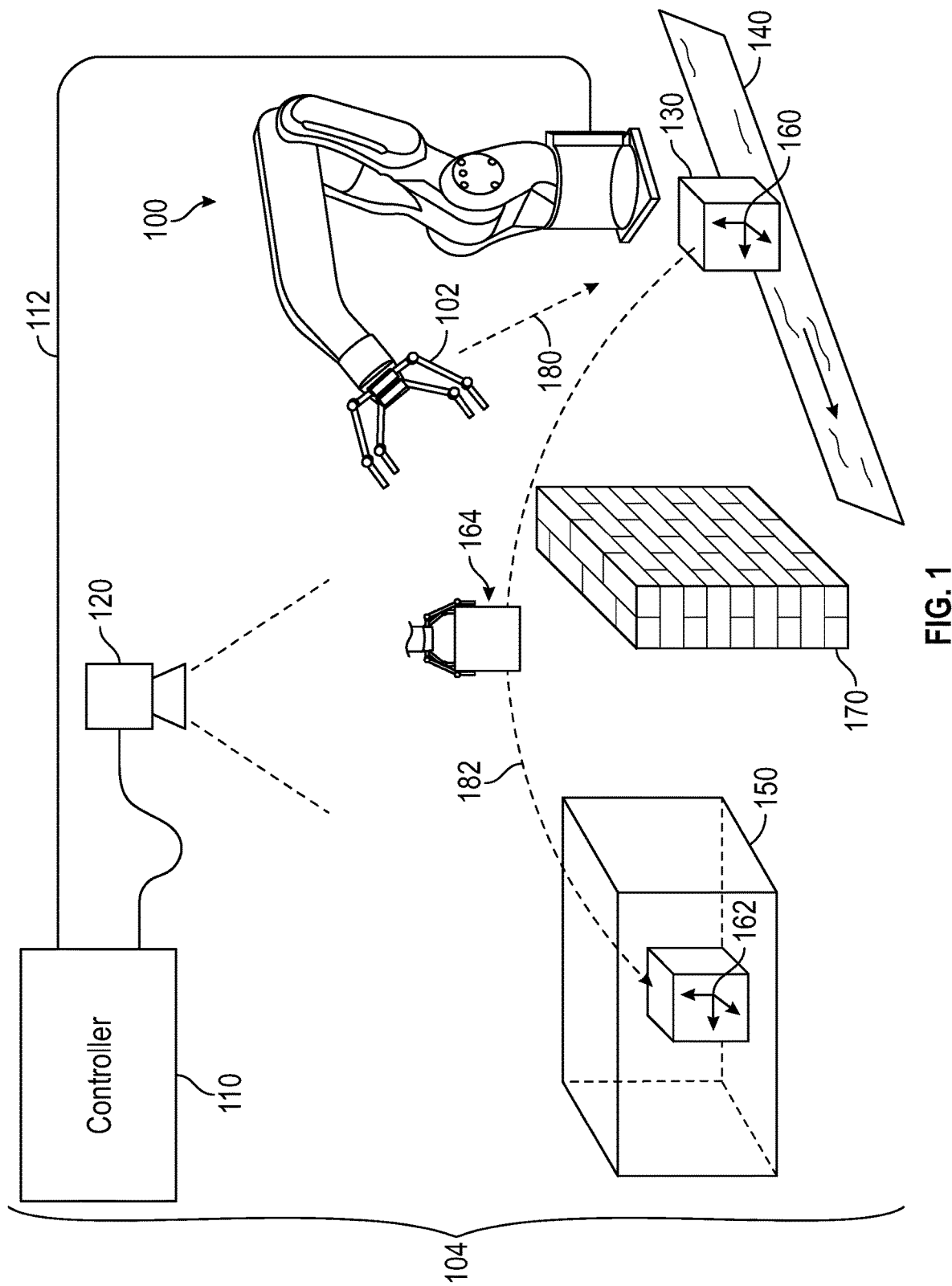
FIG. 1 is an illustration of an industrial robot performing a pick, move and place operation, where a new path must be computed for each workpiece being moved, and the workspace environment includes one or more obstacles to be avoided.

FIG. 1 is an illustration of an industrial robot performing a pick, move and place operation in a scenario of the type described above, where a new path must be computed for each workpiece being moved, and the workspace environment includes one or more obstacles to be avoided. A robot 100 having a gripper 102 operates within a workspace 104. Motion of the robot 100 is controlled by a controller 110, which typically communicates with the robot 100 via a cable 112. The controller 110 provides joint motion commands to the robot 100 and receives joint position data from encoders in the joints of the robot 100, as known in the art. The controller 110 also provides commands to control operation of the gripper 102. The pick, move and place scenario of FIG. 1 is merely illustrative and exemplary. The optimization motion planning techniques of the present disclosure are applicable to any type of robot operation, and the gripper 102 may be replaced by any type of robot tool.

A camera 120 communicates with the controller 110 and provides images of the workspace 104. Images from the camera 120 may be used to identify the position and orientation of workpieces to be operated on by the robot 100, or locations where a workpiece is to be placed by the robot 100, or even to identify moving or transient obstacles in the workspace 104. In some embodiments, the camera 120 is not needed at all—as obstacle movement is not possible, and other means are used for identifying start and goal positions of the workpieces being moved by the robot 100.

A workpiece 130 is inbound into the workspace 104 on a conveyor 140. The task of the robot 100 is to pick up the workpiece 130 from the conveyor 140, move the workpiece 130 and place it in a container 150 (such as a shipping container). Again, this is just one example of variable start and goal positions; many other examples may be envisioned. A position and orientation of a start point 160 are defined based on information about the position of the workpiece 130 on the conveyor 140 and the speed of the conveyor 140. Orientation of the workpiece 130 at the start point 160 is needed in order to determine an orientation for the gripper 102. Similarly, a position and orientation of a goal point 162 are defined based on information about the next available compartment or location within the container 150. One intermediate point 164 is illustrated in FIG. 1, partway between the start point 160 and the goal point 162. In actual robot motion planning computations, multiple intermediate path points are calculated in order to satisfy all path constraints, and a smooth tool path is computed which passes through the plurality of path points.

An obstacle 170—shown as a wall—exists between the start point 160 and the goal point 162. It can also be appreciated that the sides of the container 150 represent obstacles which must be avoided by the robot 100 and considered in path planning. Other obstacles may also exist.

For each workpiece 130 arriving on the conveyor 140, a new path must be computed by the controller 110 which causes the robot 100 to move the gripper 102 from a home or approach position along a path segment 180 to pick up the workpiece 130 at the start point 160, and move the workpiece 130 along a path segment 182 to the goal point 162 while avoiding the obstacle 170, then return the gripper 102 to the home or approach position in preparation for the next workpiece 130. The new path must be computed by the controller 110 very quickly, because the path computation must be performed in real time as fast as the robot 110 can move one workpiece 130 and return to pick up the next.

Optimization techniques have been developed and are known in the art for computing robot motions such that the tool follows a path from a particular start point to a particular goal point, while avoiding collision of the robot with any obstacles, and while satisfying other types of constraints. However, these known techniques have either not been concerned with computational efficiency, or have investigated different optimization algorithms in attempts to reduce computation time. According to the techniques of the present disclosure, computational efficiency can be improved substantially by providing a refined initial reference path to the optimization routine, rather than the naïve reference path used in prior art techniques.

Figure 2:
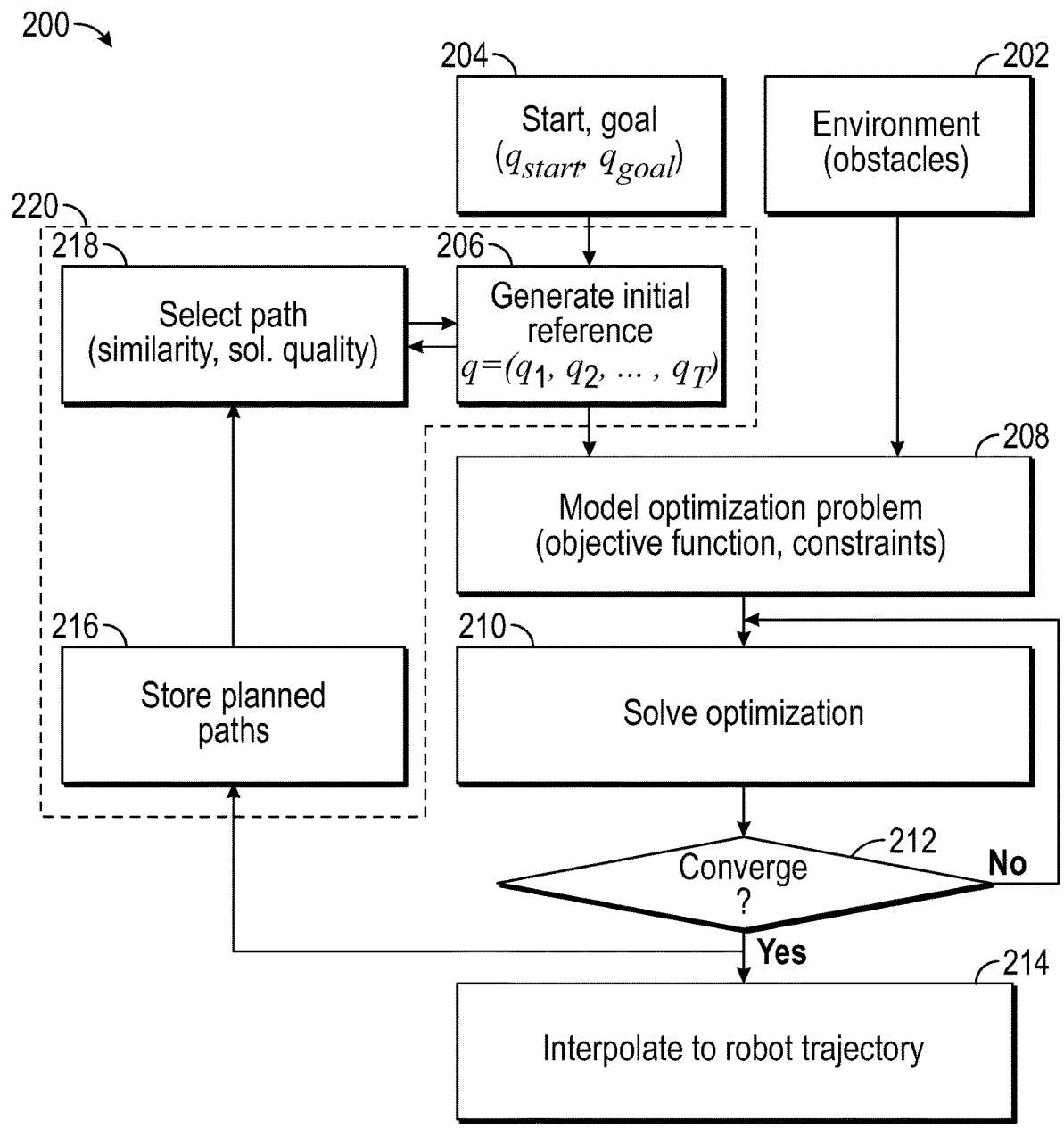
FIG. 2 is a flowchart diagram of a method for robot optimization motion planning in the scenario of FIG. 1, using a refined initial reference path, according to an embodiment of the present disclosure.

FIG. 2 is a flowchart diagram 200 of a method for robot optimization motion planning in the scenario of FIG. 1, using a refined initial reference path, according to an embodiment of the present disclosure. At box 202, the location and shape of any obstacles (the obstacle 170 and any others) in the robot workspace 104 are defined. The obstacles may be defined by CAD data in the workspace coordinate frame, or by data from a sensor such as the camera 120 as described previously. The obstacle data is typically solids, surfaces or surface point clusters, and must be sufficient to allow a collision avoidance constraint to be modeled in the optimization problem. The collision avoidance constraint is modeled such that the minimum distance between any part of the robot 100 and any obstacle exceeds a predefined threshold for each path point in the computed motion, where the minimum distance is calculated in any suitably efficient manner—such as by defining geometry primitives around the robot parts and the obstacles, or by modeling the obstacles as a distance field matrix.

At box 204, start and goal points ($q_{start}$, $q_{goal}$) for a robot path are defined, based on a task that the robot is to perform. As shown in FIG. 1, the start point 160 may be defined based on the position of an incoming workpiece 130 on the conveyor 140, and the goal point 162 may be defined based on an assigned location for the workpiece 130 to be placed in the container 150. The intermediate point 164 is not defined as an input in the motion optimization; the intermediate point 164 is an output of the optimization calculation, along with other path points. At box 206, an initial reference path is generated. The initial reference path provides a starting point (an initial solution) for the iterative motion optimization calculation. In prior art motion optimization techniques, the initial reference path is typically naïvely defined as a straight line from the start point to the goal point. Using the technique of the present disclosure, a refined initial reference path is created based on a previously-computed path having similar start and goal points. This technique is discussed in detail below, leading back to discussion of the computations at the box 206.

At box 208, the motion optimization problem is modeled in the robot controller. Modeling the motion optimization problem includes defining an objective function and various constraint functions. As such, the motion optimization problem can be defined to find an optimum path q as follows:

$$\min_{q=\{q_1,\ldots,q_T\}} f(q) \qquad (1)$$

Such that;

$$g(q) \leq 0 \qquad (2)$$

$$h(q) = 0 \qquad (3)$$

Where $f(q)$ is the optimization objective function (such as path length of the tool center point) to be minimized over the entire robot motion including poses $q=\{q_1,\ldots,q_T\}$, $g(q)$ are inequality constraints which must be satisfied (such as: joint positions remaining within limits, joint velocities, accelerations and jerk, and tool center point velocity, acceleration and jerk remaining below limits; and a collision avoidance constraint typically defined where the minimum robot-to-obstacle distance must be greater than a threshold value $d_{safe}$ for all of the robot poses in the motion solution), $h(q)$ are equality constraints which must be satisfied (such as: the locations of the start and goal points must be met; and system dynamics or kinematics equations must be satisfied).

At box 210, the optimization problem is solved. The optimization solution is an iterative computation beginning with evaluation of the constraints and objective function for the initial reference path q, with additional paths evaluated until convergence to a solution where the constraints are satisfied and the objective function is at a minimum. In order to improve the convergence behavior of the computations, the optimization problem may be convexified before solution. Convexifying the optimization problem includes approximating one or more of the constraints as polynomial-time functions, with the resulting computation being more readily solvable and yielding only one optimal solution. In one embodiment, the collision avoidance inequality constraint is linearized by being approximated as a first-order Taylor expansion.

After the optional convexification, the optimization problem is solved at the box 210, with a check at decision diamond 212 to determine whether the solution has converged to within a predefined tolerance. At box 214, the converged optimization solution is interpolated to define a complete robot trajectory including all joint motions and the tool motion which satisfies the constraint functions—including the collision avoidance constraint, the joint motion constraints, and the tool having the specified start and goal points ($q_{start}$, $q_{goal}$).

When a converged solution is reached at the decision diamond 212, the planned path is also stored as a path p in a database or data repository at box 216. According to the techniques of the present disclosure, the stored path p, which includes a plurality of path points ($p_0$, $p_1$), may be used as the basis for a new initial reference path in a later optimization motion planning sequence. Over time, a large number of planned paths will be stored in the data repository for a given robot workspace setup.

Consider a case where a new optimization motion planning calculation is to be performed according to the flowchart diagram 200 of FIG. 2. At the box 206, rather than using a naïve initial reference path such as a straight line path from $q_{start}$ to $q_{goal}$, a refined initial reference path may be calculated using the disclosed techniques. When the box 206 is encountered to generate an initial reference path, the process moves to box 218, where a candidate path is selected from the many planned paths stored in the data repository. The candidate path is selected primarily based on similarity or proximity of the start and goal points ($q_{start}$, $q_{goal}$) of the new path to the beginning and end points ($p_0$, $p_1$) of the stored planned path. Other factors may also be considered in selecting the candidate path—such as the solution quality (level of convergence), the identity of obstacles to be avoided along the path, etc. After the candidate path is selected from the store of previously planned paths at the box 218, the process returns to the box 206 to calculate a refined initial reference path.

FIGS. 3A, 3B and 3C are illustrations of a technique for modifying a previously computed path based on start and goal points of a new path to provide a refined initial reference path, according to an embodiment of the present disclosure. The presently disclosed technique includes the steps contained in area 220 shown with a dashed outline in FIG. 2. The calculation of a refined initial reference path, illustrated in FIGS. 3A, 3B and 3C, occurs in the box 206 within the area 220.

In FIG. 3A, a path 310 is shown. The path 310 is the candidate path selected at the box 218 from the repository of previously planned paths stored at the box 216. The path 310 includes a plurality of points $p_\alpha$, including a first point 312 ($p_0$) and a last point 314 ($p_1$). As mentioned earlier, the first point 312 ($p_0$) and the last point 314 ($p_1$) of the candidate path 310 should be in fairly close proximity to the start and goal points ($q_{start}$, $q_{goal}$), respectively, of the new path to be planned.

In FIG. 3B, the first point 312 ($p_0$) of the candidate path 310 is illustrated proximal a first point 322 ($q_0$) of the initial reference path being defined. The first point 322 ($q_0$) of the initial reference path being defined is equivalent to the start point ($q_{start}$) of the path being planned. A deviation 332 ($\delta_0$) is defined as the vector difference between the first point 322 ($q_0$) of the initial reference path being defined and the first point 312 ($p_0$) of the candidate path 310. That is:

$$\delta_0 = q_0 - p_0 \qquad (4)$$

Similarly, the last point 314 ($p_1$) of the candidate path 310 is illustrated proximal a last point 324 ($q_1$) of the initial reference path being defined. The last point 324 ($q_1$) of the initial reference path being defined is equivalent to the goal point ($q_{goal}$) of the path being planned. A deviation 334 ($\delta_1$) is defined as the vector difference between the last point 324 ($q_1$) of the initial reference path being defined and the last point 314 ($p_1$) of the candidate path 310. That is, the deviation 334 is computed as:

$$\delta_1 = q_1 - p_1 \qquad (5)$$

In FIG. 3C, a new initial reference path 340 includes a plurality of points $q_\alpha$ calculated from the points $p_\alpha$ of the candidate path 310, the deviations ($\delta_0$, $\delta_1$) at the two ends, and the proportional distance along the path. That is, each point in the new initial reference path 340 is computed as:

$$q_\alpha = p_\alpha + (1-\alpha)\delta_0 + \alpha\delta_1 \qquad (6)$$

Where each $\alpha$ is in the range from zero to one ($\alpha \in [0,1]$).

It can be seen in FIG. 3C that the new initial reference path 340 has a shape very similar to that of the candidate path 310. By transposing and scaling the candidate path 310 as defined above, the new initial reference path 340 has endpoints which match the start and goal points (g start, $q_{goal}$) of the new path to be planned. In addition, if the candidate path 310 is selected from a store of previously planned paths which have the same or similar obstacle environment as the new path to be planned, the new initial reference path 340 will have a shape which is a good approximation of an optimal path. The new initial reference path 340 may not quite be optimal—that is, it may pass a little too far away from the obstacles (and thus not minimize the objective function), or it may pass a little too close to the obstacles (and thus not meet a collision avoidance inequality constraint)—but the new initial reference path 340 serves as a very good starting point (initial iteration) for the optimization computation. The new initial reference path 340 is provided to the box 208 of the flowchart diagram 200, for modeling and solving the optimization problem.

Figure 4:
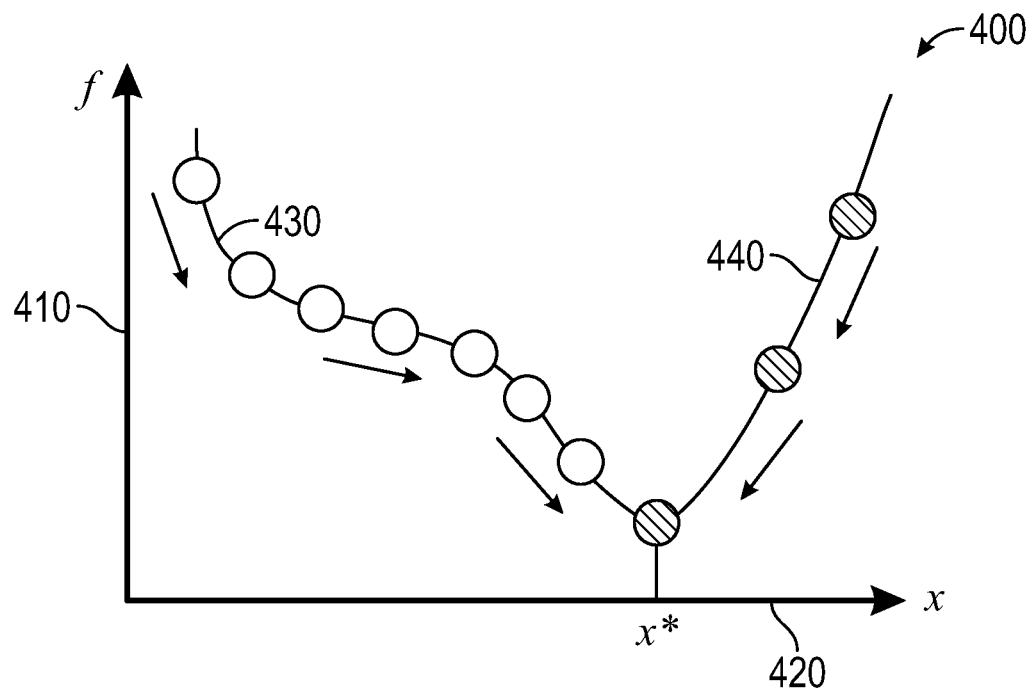
FIG. 4 is a graph depicting motion planning optimization convergence behavior of the techniques of the present disclosure compared to prior art techniques.

FIG. 4 is a graph 400 depicting motion planning optimization convergence behavior of the techniques of the present disclosure compared to prior art techniques. The graph 400 plots values of the objective function $f$ on a vertical axis 410 versus values of a state variable x on a horizontal axis 420. The optimized path being computed is represented by a state $x^*$. The graph 400 includes a curve 430 showing the iteration and convergence behavior of an optimization motion planning computation which starts with a naïve initial reference path. The curve 430 includes a fairly large number of iterations, and it can be seen that it wanders around and includes iterations which do not uniformly and directly lead to the state $x^*$ of the optimized solution path. This is the nature of convergence behavior in complex optimization problems when the initial reference solution is far from the optimum solution.

The graph 400 also includes a curve 440 showing the iteration and convergence behavior of an optimization motion planning computation which starts with a refined initial reference path according to embodiments of the present disclosure. The refined initial reference path is computed as shown in FIGS. 3A, 3B and 3C and discussed above. The curve 440 includes a small number of iterations, and it can be seen that it leads directly to the state $x^*$ of the optimized solution path. This rapid convergence behavior, due to the similarity of the refined initial reference path to the optimum path, represents a significant benefit of the presently disclosed techniques. The rapid convergence resulting from the refined initial reference path is desirable in all motion planning computation applications, and is particularly desirable when motion planning computations must be performed in real time for robotic applications with unique start and/or goal points for each task.

Figure 5:
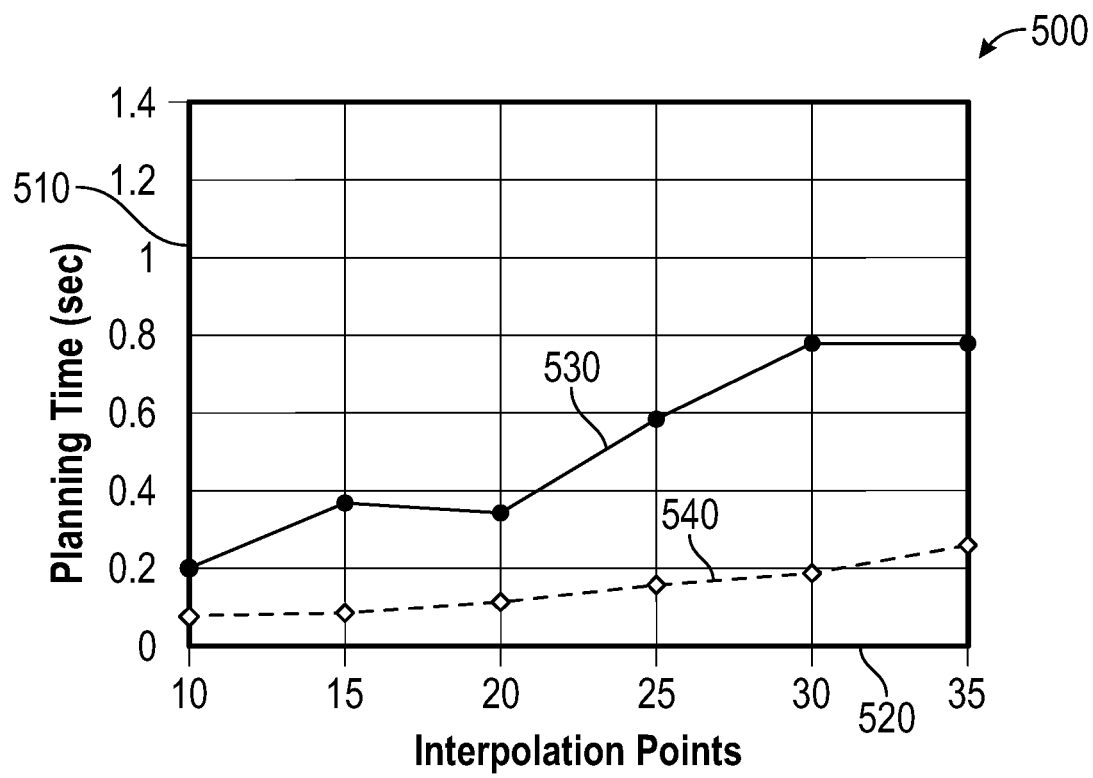
FIG. 5 is a graph depicting motion planning optimization computation time for the techniques of the present disclosure compared to prior art techniques.

FIG. 5 is a graph 500 depicting motion planning optimization computation time for the techniques of the present disclosure compared to prior art techniques. The graph 500 plots optimization motion planning (computation) time on a vertical axis 510 versus a number of interpolation points (the number of points a) in the path being computed on a horizontal axis 520. The graph 500 includes a curve 530 showing the computation times, on a representative robot controller, for an optimization motion planning computation which starts with a naïve initial reference path. The curve 530 climbs dramatically for larger numbers of interpolation points, with computation times approaching one second. This again is the nature of convergence behavior in complex optimization problems when the initial reference solution is far from the optimum solution, and results in computation times which are too long to be performed in real time.

The graph 500 also includes a curve 540 showing the computation times, on the same representative robot controller, for an optimization motion planning computation which starts with a refined initial reference path according to embodiments of the present disclosure. The curve 540 only climbs slightly for larger numbers of interpolation points, with computation times near or below 0.2 seconds—a factor of three to four less than the equivalent computation times resulting from a naïve initial reference path.

When motion planning computations must be performed in real time for robotic applications with unique start and/or goal points for each task, the difference between the motion planning computation times illustrated in FIG. 5 are particularly significant. The presently disclosed techniques enable motion planning computations to be performed rapidly enough to sustain full-speed operation of the robot, where prior art motion planning techniques with a naïve initial reference path may require the robot speed to be reduced to wait for motion planning computations to be completed.

Figure 6A:
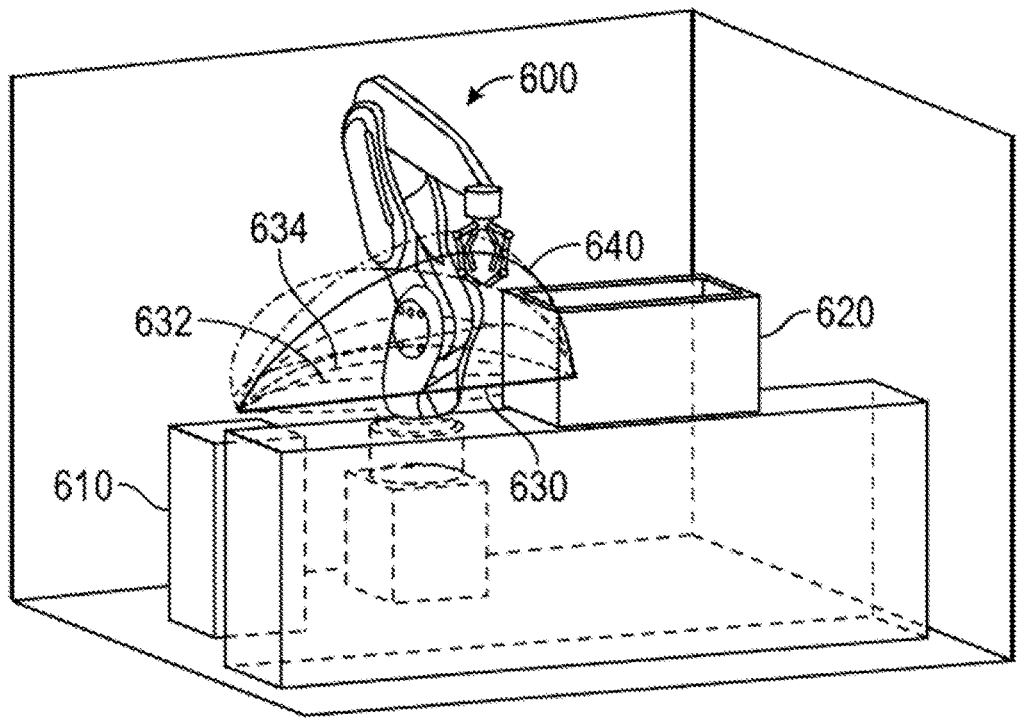
FIG. 6A is an illustration of a robot with traces of the many path iterations computed in optimization motion planning using a naïve initial reference, according to techniques known in the art.

FIG. 6A is an illustration of a robot 600 with traces of the many path iterations computed in optimization motion planning using a naïve initial reference, according to techniques known in the art. In FIG. 6A (and FIG. 6B discussed below), the scenario is that the robot 600 is picking up a workpiece from a stand 610 and placing the workpiece in a container 620. The stand 610 could be replaced with an inbound conveyor, and the container 620 could have defined compartments within, thereby necessitating a new motion path to be computed for each workpiece.

In FIG. 6A, the optimization computation requires many iterations to reach convergence to a final path 640 after starting with a naïve initial reference path 630. The path associated with each iteration is drawn in FIG. 6A. The many iterations (paths 630, 632, 634, etc.) represent the dots on the curve 430 of FIG. 4. From the naïve (straight line) initial reference path 630, the next few iterations yield paths which begin to arch upward, but not enough to avoid collision with the obstacle represented by the side wall of the container 620. Eventually the path 640 is found which arches high enough to pass over the side wall of the container 620; however, it takes many iterations to find the path 640 because of the lack of similarity to the naïve initial reference path 630.

Figure 6B:
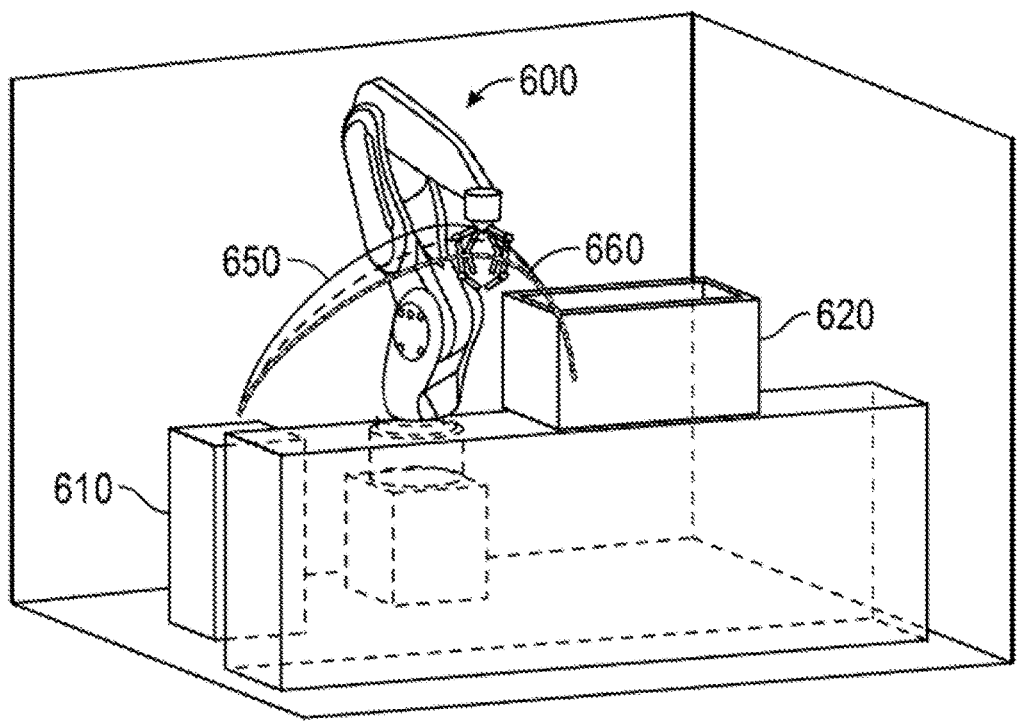
FIG. 6B is an illustration of a robot with traces of the few path iterations computed in optimization motion planning using a refined initial reference, according to embodiments of the present disclosure.

FIG. 6B is an illustration of the robot 600 with traces of the few path iterations computed in optimization motion planning using a refined initial reference, according to embodiments of the present disclosure. In FIG. 6B, the optimization computation requires very few iterations to reach convergence to a final path 660 after starting with a refined initial reference path 650. The few iterations (the paths 650 and 660, and only one intermediate) represent the dots on the curve 440 of FIG. 4. The refined initial reference path 650 is so similar to the final path 660 that the optimization computation converges in just two iterations after the initial reference. FIG. 6B visually illustrates the efficiency associated with the optimization motion planning technique using a refined initial reference path according to the present disclosure. This efficiency results in much shorter computation times than prior art methods, enabling real time motion planning for applications where a new path must be calculated for each workpiece.

Throughout the preceding discussion, various computers and controllers are described and implied. It is to be understood that the software applications and modules of these computer and controllers are executed on one or more computing devices having a processor and a memory module. In particular, this includes a processor in the robot controller 110 of FIG. 1 discussed above. Specifically, the processor in the controller 110 is configured to provide a refined initial reference path for optimization path planning computations in the manner described throughout the foregoing disclosure and particularly in the flowchart diagram 200. It is also possible for another computer to perform the optimization motion planning and provide the computed path to the controller 110, in which case the controller 110 simply controls the robot 100, and the other computer is configured to provide and use the refined initial reference path for optimization path planning computations.

As outlined above, the disclosed techniques for a robot optimization motion planning technique using a refined initial reference path improve the speed and reliability of robot path planning. The disclosed techniques provide much more rapid convergence on an optimum path than experienced when using a naïve initial reference path, and the rapid convergence enables path planning to be performed in real time for applications where a new path must be computed for each workpiece.

While a number of exemplary aspects and embodiments of the robot optimization motion planning technique using a refined initial reference path have been discussed above, those of skill in the art will recognize modifications, permutations, additions and sub-combinations thereof. It is therefore intended that the following appended claims and claims hereafter introduced are interpreted to include all such modifications, permutations, additions and sub-combinations as are within their true spirit and scope.

What is claimed is:

1. A method for motion planning of an industrial robot, said method comprising:
providing input information for planning a path of a tool on the robot, including a start point and a goal point for the path of the tool;
generating an initial reference path, including selecting a candidate path from a repository of previously computed paths, and transposing and scaling the candidate path to generate the initial reference path with first and last points matching the start point and the goal point, respectively, including transposing a first point of the candidate path by a first deviation to match the start point and transposing a last point of the candidate path by a second deviation to match the goal point;
modeling a robot motion optimization problem, using a computer having a processor and memory, including defining an objective function, and defining the start and goal points of the path as equality constraints;
solving the robot motion optimization problem, by the computer, to yield the path of the tool, where the initial reference path is used as a first iteration in solving the optimization problem; and
storing the path in the repository.

2. The method according to claim 1 wherein providing input information further includes providing obstacle data defining obstacles in a workspace of the robot, and modeling a robot motion optimization problem includes defining a collision avoidance inequality constraint using the obstacle data.

3. The method according to claim 2 wherein the collision avoidance inequality constraint is that a minimum robot-to-obstacle distance for each computed pose of the robot must exceed a predefined threshold.

4. The method according to claim 1 wherein selecting a candidate path includes selecting the candidate path based on proximity of a first and last point of the candidate path to the start point and the goal point, respectively.

5. The method according to claim 4 wherein selecting a candidate path further includes selecting the candidate path based on at least one of a solution quality of the candidate path, and an obstacle environment used in computing the candidate path.

6. The method according to claim 1 wherein transposing and scaling the candidate path to define the initial reference path includes computing the first deviation of the first point of the candidate path from the start point and the second deviation of the last point of the candidate path from the goal point, and computing points on the initial reference path by proportionally applying the first deviation and the second deviation along a length of the candidate path.

7. The method according to claim 6 wherein points on the initial reference path are computed using an equation:

$$q_\alpha = p_\alpha + (1-\alpha)\delta_0 + \alpha\delta_1$$

Where $q_\alpha$ is a point on the initial reference path, $p_\alpha$ is a point on the candidate path, $\delta_0$ is the first deviation, $\delta_1$ is the second deviation, and $\alpha$ is a proportional distance along the candidate path in a range from zero to one.

8. The method according to claim 1 wherein modeling a robot motion optimization problem further includes defining an equality constraint based on system dynamics or kinematics equations for each joint of the robot, and defining inequality constraints, including robot joint rotational velocity, acceleration and jerk not exceeding predefined thresholds, robot tool center point velocity, acceleration and jerk not exceeding predefined thresholds, and joint positions not exceeding predefined limits.

9. The method according to claim 1 wherein solving the motion optimization problem includes iteratively solving the motion optimization problem until a solution converges to a predefined convergence criteria.

10. The method according to claim 1 further comprising computing motions of all joints of the robot which cause the tool to follow the path, and providing joint motion commands to the robot.

11. A method for planning a path of an industrial robot, said method comprising providing a start point and a goal point for a path of a tool on the robot, generating an initial reference path by selecting a candidate path from a repository of previously computed paths and transposing and scaling the candidate path to generate the initial reference path with first and last points matching the start point and the goal point, respectively, including transposing a first point of the candidate path by a first deviation to match the start point and transposing a last point of the candidate path by a second deviation to match the goal point, modeling and solving a robot motion optimization problem using the initial reference path as a first iteration to yield the path of the tool, and storing the path in the repository.

12. The method according to claim 11 wherein modeling a robot motion optimization problem further includes defining an equality constraint based on system dynamics or kinematics equations for each joint of the robot, defining inequality constraints based on joint position, velocity, acceleration and jerk limits, and defining a collision avoidance inequality constraint based on robot workspace obstacle data.

13. A path planning system for an industrial robot, said system comprising:
a computer in communication with the robot, said computer having a processor and memory configured for:
receiving input information for planning a path of a tool on the robot, including a start point and a goal point for the path of the tool;
generating an initial reference path, including selecting a candidate path from a repository of previously computed paths, and transposing and scaling the candidate path to generate the initial reference path with first and last points matching the start point and the goal point, respectively, including transposing a first point of the candidate path by a first deviation to match the start point and transposing a last point of the candidate path by a second deviation to match the goal point;

modeling a robot motion optimization problem, including defining an objective function, and defining the start and goal points of the path as equality constraints;

solving the robot motion optimization problem to yield the path of the tool, where the initial reference path is used as a first iteration in solving the optimization problem; and storing the path in the repository.

14. The system according to claim 13 wherein the input information further includes obstacle data defining obstacles in a workspace of the robot, and modeling a robot motion optimization problem includes defining a collision avoidance inequality constraint using the obstacle data, where the collision avoidance inequality constraint is that a minimum robot-to-obstacle distance for each computed pose of the robot must exceed a predefined threshold.

15. The system according to claim 13 wherein selecting a candidate path includes selecting the candidate path based on proximity of a first and last point of the candidate path to the start point and the goal point, respectively.

16. The system according to claim 15 wherein selecting a candidate path further includes selecting the candidate path based on at least one of a solution quality of the candidate path, and an obstacle environment used in computing the candidate path.

17. The system according to claim 13 wherein transposing and scaling the candidate path to define the initial reference path includes computing the first deviation of the first point of the candidate path from the start point and the second deviation of the last point of the candidate path from the goal point, and computing points on the initial reference path by proportionally applying the first deviation and the second deviation along a length of the candidate path.

18. The system according to claim 13 wherein modeling a robot motion optimization problem further includes defining an equality constraint based on system dynamics or kinematics equations for each joint of the robot, and defining inequality constraints, including robot joint rotational velocity, acceleration and jerk not exceeding predefined thresholds, robot tool center point velocity, acceleration and jerk not exceeding predefined thresholds, and joint positions not exceeding predefined limits.

19. The system according to claim 13 wherein solving the motion optimization problem includes iteratively solving the motion optimization problem until a solution converges to a predefined convergence criteria.

20. The system according to claim 13 wherein the computer is further configured for computing motions of all joints of the robot which cause the tool to follow the path, and providing joint motion commands to the robot.

* * * * *